(No Model.) 2 Sheets—Sheet 2.

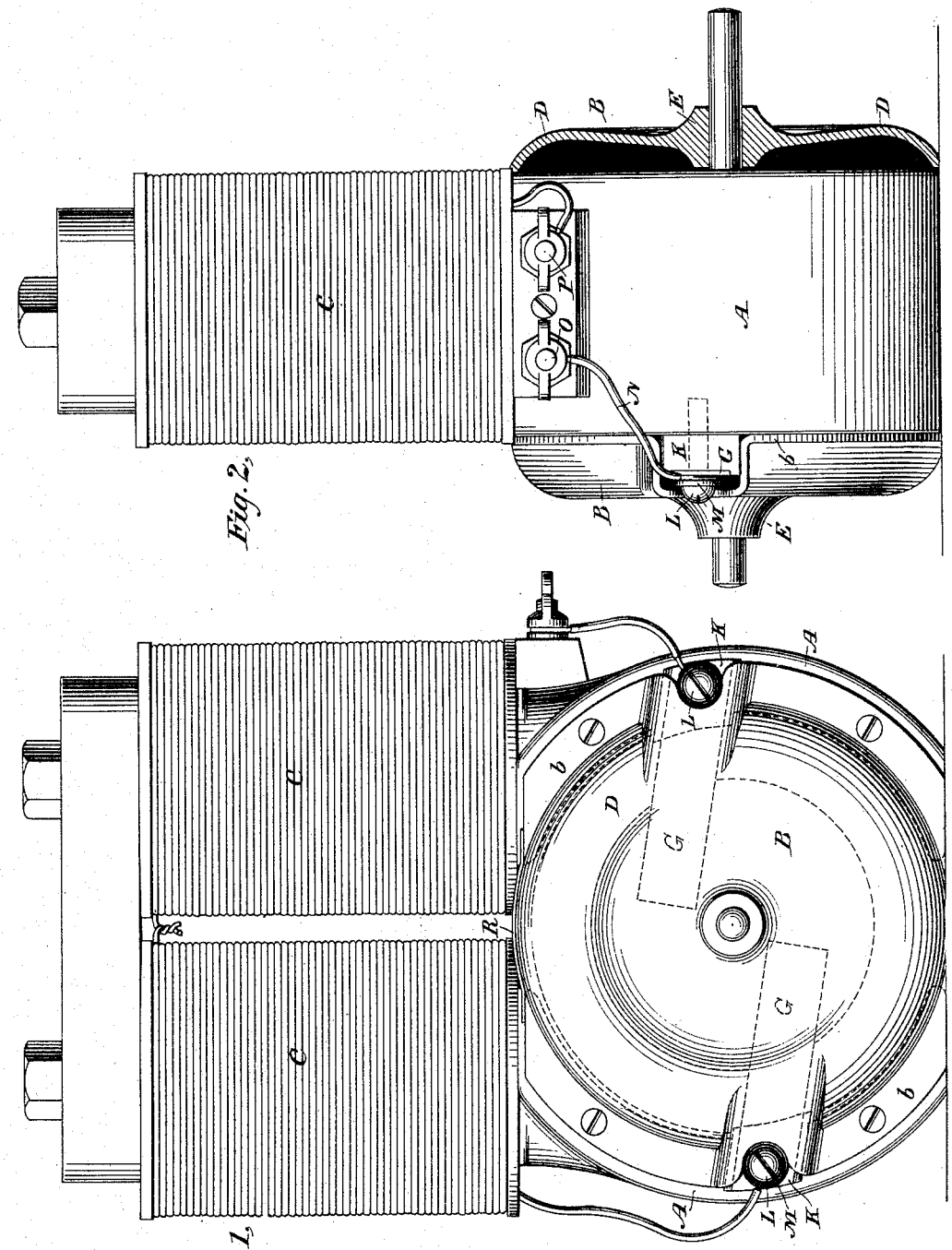

C. G. CURTIS & S. S. WHEELER.
DYNAMO ELECTRIC MACHINE AND ELECTRIC MOTOR.

No. 354,539. Patented Dec. 21, 1886.

Witnesses
Geo. W. Breck
Chas. J. Maguire

Inventors
C. G. Curtis & S. S. Wheeler
By their Attorneys
Curtis & Crocker

UNITED STATES PATENT OFFICE.

CHARLES G. CURTIS AND SCHUYLER S. WHEELER, OF NEW YORK, N. Y., ASSIGNORS TO THE C. & C. ELECTRIC MOTOR COMPANY.

DYNAMO-ELECTRIC MACHINE AND ELECTRIC MOTOR.

SPECIFICATION forming part of Letters Patent No. 354,539, dated December 21, 1886.

Application filed July 21, 1886. Serial No. 208,681. (No model.)

*To all whom it may concern:*

Be it known that we, CHARLES G. CURTIS and SCHUYLER S. WHEELER, of the city, county, and State of New York, have invented certain Improvements in Dynamo-Electric Machines and Electric Motors, of which the following is a specification.

In an application filed by said Curtis and Francis B. Crocker, March 4, 1886, and also in an application filed by us July 14, 1886, there are described certain forms of armatures for such machines.

Our present invention consists in certain improvements in the construction of the field-magnet and mounting of the armature, which are particularly applicable to the forms of armature described in these applications, and by which we are enabled to make such machines much more compact, and at the same time to simplify them and greatly reduce their cost of construction.

Figure 3:
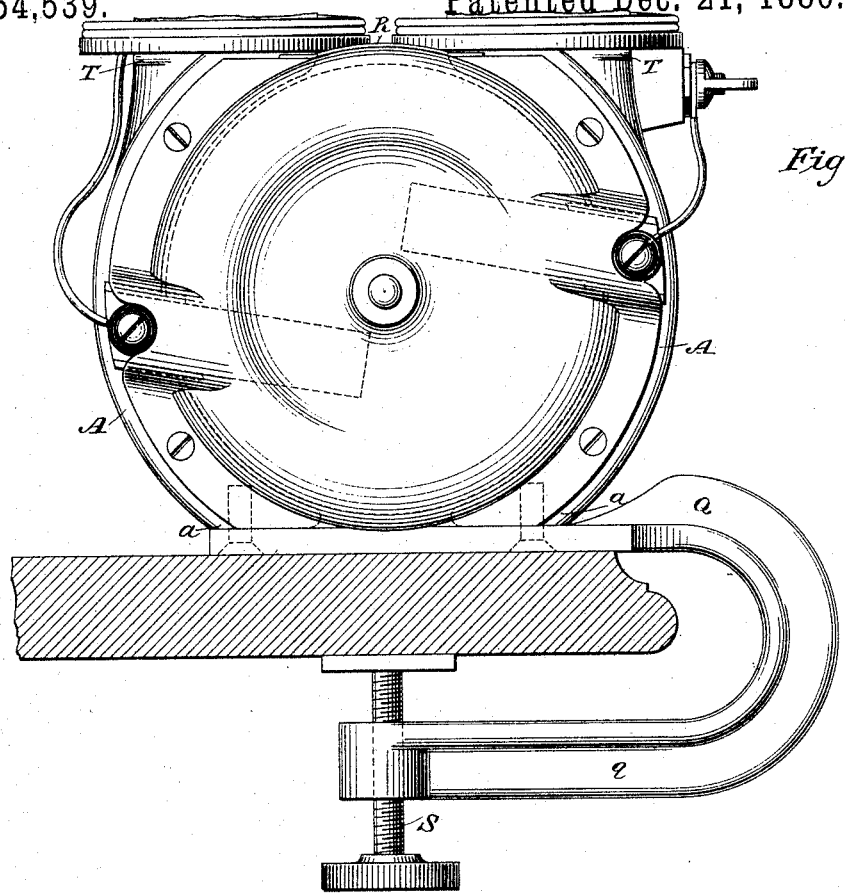
Figure 4:
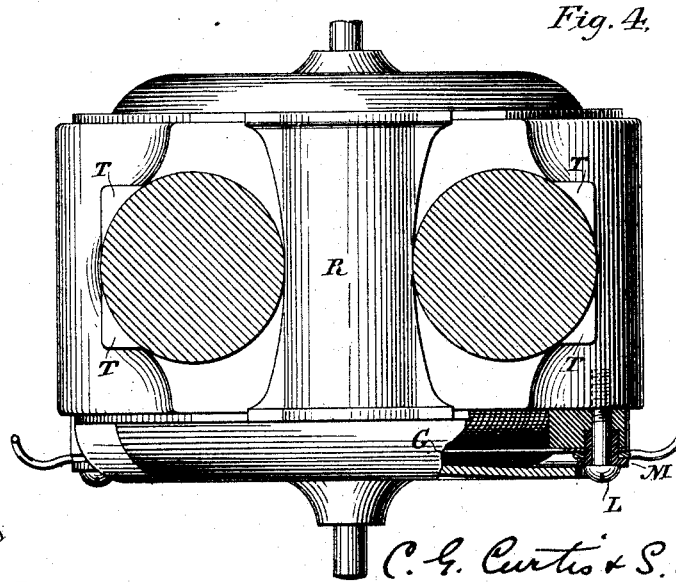

Our invention is represented in the accompanying drawings, Figure 1 being a front view of our dynamo machine or motor; Fig. 2 being a side view of the same, showing one of the bearing or end plates according to our invention, partly in section; Fig. 3 being a front view showing the lower part of our machine, and the way of attaching it to a table or platform by means of our improved clamp; and Fig. 4 being a top view of the same part of the machine, showing the field-magnet cores in section and without any field winding.

We have shown our invention applied to the ordinary horseshoe-shaped field-magnet magnetized by two coils, C C; but it will be evident that it may be applied to other well-known forms of field-magnet in which the pole-pieces are magnetized in a different way. In order to form a bearing for the armature-shaft, and at the same time to inclose and protect the armature, together with the commutator and commutator-brushes, so that these parts will be protected from injury by improper handling, or from something getting in the way or striking the commutator or armature when it is revolving, we face off or form the edges or sides of the pole-pieces A A so that a cap or plate, B, can be conveniently screwed or otherwise attached thereto. This plate may be conveniently stamped out of sheet metal, or formed from a casting, if desirable, and we prefer to make it with a flange, *b*, which is screwed directly to the sides of the pole-pieces, as shown, and a bell-shaped or bulging part, D, as seen in section in Fig. 2, so as to leave an annular space extending somewhat beyond the pole-pieces for the armature to project into, leaving clearance enough for the armature to revolve properly. In the center of the plate or cap B is formed a hub or boss, E, which is drilled out and forms a suitable bearing for the armature-shaft. The form of armature which is best adapted to this method of mounting, though it may be applied to other forms of armature, is one provided with a flat or disk commutator like that described in the two applications before referred to. In order to get the commutator-brushes with this form of armature within the plate B, so as to entirely inclose and protect them, we mount the brushes upon the sides or edges of the pole-pieces A and form the plate B with suitable openings or recesses to receive the brushes, so that when the plate B is in place the entire brushes, or at least practically the whole of each brush, is entirely covered and protected by the plate.

The brush-recesses in the plate may be made of any desired shape and formed in any desired way; but in order to simplify and cheapen the cost of construction as much as possible we form these recesses in the shape of flat arched tunnels or hoods, as clearly indicated, by stamping the plates, and in so doing drawing up the metal at these points. Into each hood is fitted a support or block, K, of some hard insulating material—such as rubber—which fits the hood closely, so that it cannot twist. The brushes G fit closely in seats in the blocks K, so that the blocks K guide and determine the positions of the brushes G when they are in place; consequently when the machine is put together the blocks K are guided into place by the sides of the hoods, and the brushes G are guided into place by the blocks K, so that no special adjustment of the brushes in each machine is necessary. The brushes and blocks are screwed to the pole-pieces by screws L, which pass through the brush and the insulating-block and screw into the pole-piece, contact between the screw and the brush being prevented by an insulating-bushing, M, formed with a shoulder, which surrounds the screw-shank where it passes through the brush, the connecting-wire N, which connects with one of the binding-posts O, being connected to the brush in any desirable way by clamping it between the shoulder M and the brush, as shown, for example. This method of mounting forms an extremely cheap and simple construction and makes the brushes self-adjusting; but it will be evident that the brushes may be mounted and held in position in other ways, if desirable.

The end of the armature away from the commutator may of course be mounted in any form of bearing; but we prefer to mount it in an end or cap plate, B, like the plate at the other end of the armature already described, except that it contains no spaces or recesses for the brushes, so as to inclose and protect this end of the armature also; and in order to entirely inclose the armature and form a complete casing therefor, which will prevent its being tampered with and protect it from accidental injuries by anything dropping into the armature-space, we introduce a covering-plate or shield, R, so as to cover up the remaining opening between the upper ends of the pole-pieces, and thereby completely inclose the chamber or space in which the armature revolves. We make this plate slightly arched to conform to the circle of the field and slip it in between the field-coils and the end plates, where it is held in place by shoulders with edges which rest on the end plates.

In order to support the washers or disks which hold the field-coils C in place, the field-coils are formed with small shoulders or lugs T T, which co-operate with the upper extremity of the pole-pieces, to enable the washer or disk to be put on true and insure a regular winding.

To enable the machine to be readily attached to a table or platform, the machine may be provided with a rigid clamp, Q, attached to the machine, formed with an arm, q, reaching under the table, and provided with a clamping-screw, S. In order to attach this clamp firmly to the machine, and at the same time connect the bottom or feet a a of the pole-pieces so as to hold them rigidly in their proper positions with respect to each other, we make the clamp of brass or other non-magnetic material, and form it with a flat portion, which extends across between the two pole-pieces and is rigidly screwed or bolted to the poles.

What we claim as our invention, and desire to secure by Letters Patent, is—

1. The combination, with the pole-pieces of a dynamo-electric machine or electric motor, of an end plate or cap attached to the pole-pieces, which acts as or supports a bearing for the armature-shaft and forms a shield or cover which incloses and protects the armature and also the commutator and brushes, substantially as described.

2. The combination, with the pole-pieces of a dynamo-electric machine or electric motor, and an armature provided with a flat or disk commutator, of an end plate or cap attached to the pole-pieces, which acts as or supports a bearing for the armature-shaft and forms a shield or cover which incloses the armature and also the commutator and brushes, substantially as described.

3. The combination, with the pole-pieces of a dynamo-electric machine or electric motor, of an end plate or cap attached to the pole-pieces, which acts as or supports a bearing for the armature-shaft and forms a shield or cover which incloses and protects the armature and also the commutator and brushes and is provided with recesses or openings to receive the brushes.

4. The combination, with the pole-pieces of a dynamo-electric machine or electric motor, of an end plate or cap attached to the pole-pieces, which acts as or supports a bearing for the armature-shaft and forms a shield or cover which incloses and protects the end of the armature and also the commutator and brushes, and is provided with recesses or openings which guide and determine the position of the brushes.

5. The combination, with the pole-pieces A A, of the plate or cap B, attached thereto, formed with recesses or hoods to receive the brushes, and the brushes G, attached to the pole-pieces and passing through the hoods.

6. The combination, with the pole-pieces A A, of the end plate or cap, B, attached thereto, formed with the hoods to receive the brushes, and the insulating-blocks K and brushes G, mounted thereon.

7. The combination, with the pole-pieces A A, of the end plate or cap, B, attached thereto, formed with the hoods to receive the brushes, and the insulating blocks or supports K, fitting closely within, so as to have their positions determined by the hoods, and the brushes G, mounted in recesses or slots in the said blocks.

8. The combination of the pole-pieces A A, the plate or cap B, attached thereto, formed with the flange b and hoods to receive the brushes, the blocks K, fitted closely within, so as to have their positions determined by the hoods, the brushes G, resting in and guided by the blocks K, and the screws L, passing through the brushes and blocks and screwed into the pole-pieces.

9. A dynamo-electric machine or electric motor having its armature, together with the commutator and brushes, entirely inclosed by a casing formed of the pole-pieces and suitable shields or covering-plates attached thereto, so as to completely cover and inclose the armature and commutator-space, substantially as described.

10. The combination, with the pole-pieces A A, of the clamp Q, of non-magnetic material, rigidly fixed to each of the pole-pieces at its foot a, and provided with the screw S.

CHARLES G. CURTIS.
SCHUYLER S. WHEELER.

Witnesses:
GEO. BRUSH,
CHAS. J. MAGUIRE.